(12) United States Patent
Buckley

(10) Patent No.: US 10,282,184 B2
(45) Date of Patent: May 7, 2019

(54) METADATA APPLICATION CONSTRAINTS WITHIN A MODULE SYSTEM BASED ON MODULAR DEPENDENCIES

(71) Applicant: Oracle International Corporation, Redwood Shores, CA (US)

(72) Inventor: Alexander R. Buckley, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/638,112

(22) Filed: Jun. 29, 2017

(65) Prior Publication Data
US 2018/0081785 A1    Mar. 22, 2018

Related U.S. Application Data

(60) Provisional application No. 62/395,893, filed on Sep. 16, 2016.

(51) Int. Cl.
| | |
|---|---|
| G06F 9/44 | (2018.01) |
| G06F 8/54 | (2018.01) |
| G06F 8/20 | (2018.01) |
| G06F 9/445 | (2018.01) |
| G06F 21/62 | (2013.01) |
| G06F 11/36 | (2006.01) |
| G06F 8/41 | (2018.01) |

(52) U.S. Cl.
CPC .............. *G06F 8/54* (2013.01); *G06F 8/20* (2013.01); *G06F 8/433* (2013.01); *G06F 9/445* (2013.01); *G06F 11/3624* (2013.01); *G06F 21/62* (2013.01)

(58) Field of Classification Search
CPC . G06F 8/20; G06F 8/443; G06F 9/445; G06F 11/6324; G06F 21/62
See application file for complete search history.

(56) References Cited

U.S. PATENT DOCUMENTS

| | | | |
|---|---|---|---|
| 6,883,163 B1 | 4/2005 | Schwabe | |
| 6,951,022 B1 | 9/2005 | Golde et al. | |
| 6,981,245 B1 | 12/2005 | Schwabe | |
| 6,983,460 B1 | 1/2006 | Goire et al. | |
| 6,986,132 B1 | 1/2006 | Schwabe | |
| 7,032,216 B1 | 4/2006 | Nizhegorodov | |
| 7,051,323 B2 | 5/2006 | Lam et al. | |
| 7,228,532 B1 | 6/2007 | Shaylor et al. | |
| 7,360,206 B1 | 4/2008 | Hatcher | |
| 7,434,202 B2 * | 10/2008 | Kramer ................... | G06F 8/71 717/102 |
| 7,487,507 B1 | 2/2009 | Lun et al. | |
| 7,503,031 B2 | 3/2009 | Chang et al. | |
| 7,565,364 B1 | 7/2009 | Darcy et al. | |

(Continued)

OTHER PUBLICATIONS

Faycal et al., "An Agent Based Encapsulator System: For Integrating and Composing Legacy System Functionalities", 2015 IEEE / WIC / ACM International Conference on Web Intelligence and Intelligent Agent Technology, Dec. 2015, pp. 84-87.

(Continued)

*Primary Examiner* — Hanh Thi-Minh Bui
(74) *Attorney, Agent, or Firm* — Invoke

(57) ABSTRACT

Declarations of annotation types, which specify annotations, are themselves annotated by meta-annotations. Meta-annotations define constraints based on modular dependencies.

19 Claims, 9 Drawing Sheets

(56) References Cited

U.S. PATENT DOCUMENTS

| | | |
|---|---|---|
| 7,752,599 B2 | 7/2010 | Takacsi-Nagy et al. |
| 7,895,445 B1 | 2/2011 | Albanese et al. |
| 8,082,542 B2 | 12/2011 | Bottomley et al. |
| 8,307,352 B2 | 11/2012 | Mausolf et al. |
| 8,352,925 B2 | 1/2013 | Russell et al. |
| 8,584,104 B2 | 11/2013 | Gibbons et al. |
| 9,069,568 B2 | 6/2015 | Schmidt et al. |
| 9,069,582 B2 | 6/2015 | Mausolf et al. |
| 9,098,715 B1 | 8/2015 | Spear, Jr. et al. |
| 9,116,707 B2 | 8/2015 | Reinhold et al. |
| 9,128,789 B1 | 9/2015 | Zorzella et al. |
| 9,292,315 B1 | 3/2016 | Dawson et al. |
| 9,298,448 B2 | 3/2016 | Elias et al. |
| 9,323,501 B1 | 4/2016 | Ielceanu et al. |
| 9,336,018 B2 | 5/2016 | Zhou et al. |
| 9,361,070 B1 | 6/2016 | Nuss |
| 9,448,873 B2 * | 9/2016 | Huang ............... G06F 11/079 |
| 9,489,214 B2 | 11/2016 | Cobb |
| 9,656,171 B2 | 5/2017 | Itsuno |
| 9,977,654 B2 * | 5/2018 | Coslovi ............... G06F 8/20 |
| 2002/0120717 A1 | 8/2002 | Giotta |
| 2003/0009747 A1 | 1/2003 | Duran |
| 2003/0041167 A1 | 2/2003 | French et al. |
| 2003/0041238 A1 | 2/2003 | French et al. |
| 2003/0101381 A1 | 5/2003 | Mateev et al. |
| 2003/0191864 A1 | 10/2003 | Govindarajapuram et al. |
| 2004/0003079 A1 | 1/2004 | Aiu et al. |
| 2004/0181471 A1 | 9/2004 | Rogers |
| 2005/0050528 A1 | 3/2005 | Wang |
| 2005/0055681 A1 | 3/2005 | Gadre |
| 2005/0055682 A1 | 3/2005 | Gadre et al. |
| 2005/0193137 A1 | 9/2005 | Farnham |
| 2005/0198624 A1 | 9/2005 | Chipman |
| 2005/0216885 A1 | 9/2005 | Ireland |
| 2006/0026126 A1 | 2/2006 | Cabillic |
| 2006/0074989 A1 | 4/2006 | Laborczfalvi et al. |
| 2006/0101092 A1 | 5/2006 | Ishida et al. |
| 2006/0190935 A1 | 8/2006 | Kielstra et al. |
| 2006/0265760 A1 | 11/2006 | Daemke et al. |
| 2006/0288353 A1 | 12/2006 | King et al. |
| 2007/0006141 A1 | 1/2007 | Bracha et al. |
| 2007/0011451 A1 | 1/2007 | Botzum et al. |
| 2007/0011723 A1 | 1/2007 | Chao |
| 2007/0027907 A1 | 2/2007 | Kulkarni et al. |
| 2007/0061456 A1 | 3/2007 | Waris |
| 2007/0192380 A1 | 8/2007 | Tabellion et al. |
| 2007/0192830 A1 | 8/2007 | O'Connor |
| 2007/0288280 A1 | 12/2007 | Gilbert et al. |
| 2008/0010649 A1 | 1/2008 | Grimaud et al. |
| 2008/0022260 A1 | 1/2008 | Kinder et al. |
| 2008/0091792 A1 | 4/2008 | Mei et al. |
| 2008/0127070 A1 | 5/2008 | Barcia et al. |
| 2008/0134154 A1 | 6/2008 | Patel et al. |
| 2008/0134207 A1 | 6/2008 | Chamieh et al. |
| 2008/0172656 A1 | 7/2008 | Russell et al. |
| 2008/0172658 A1 | 7/2008 | Russell et al. |
| 2008/0276231 A1 | 11/2008 | Huang et al. |
| 2008/0282266 A1 | 11/2008 | Kabanov |
| 2009/0070792 A1 | 3/2009 | Cable |
| 2009/0100404 A1 | 4/2009 | Chaturvedi et al. |
| 2009/0113406 A1 | 4/2009 | Bandaram et al. |
| 2009/0133001 A1 | 5/2009 | Rozenfeld |
| 2009/0150864 A1 | 6/2009 | Meijer et al. |
| 2009/0164760 A1 | 6/2009 | Sterbenz |
| 2009/0249311 A1 | 10/2009 | Dandamudi et al. |
| 2010/0083004 A1 | 4/2010 | Kirshenbaum |
| 2010/0138820 A1 | 6/2010 | Joshi |
| 2011/0029960 A1 | 2/2011 | Cimadamore et al. |
| 2011/0131561 A1 | 6/2011 | Adams, III et al. |
| 2011/0145278 A1 | 6/2011 | Maes |
| 2011/0239184 A1 | 9/2011 | Feigen |
| 2011/0271251 A1 | 11/2011 | Buckley et al. |
| 2011/0271254 A1 | 11/2011 | Reinhold et al. |
| 2011/0283256 A1 | 11/2011 | Raundahl Gregersen et al. |
| 2011/0302565 A1 | 12/2011 | Ferris et al. |
| 2011/0321019 A1 | 12/2011 | Gibbons et al. |
| 2012/0005660 A1 | 1/2012 | Goetz et al. |
| 2012/0036462 A1 | 2/2012 | Schwartz et al. |
| 2012/0096433 A1 | 4/2012 | Reinhold et al. |
| 2012/0117538 A1 | 5/2012 | Buckley |
| 2012/0151505 A1 | 6/2012 | Verissimo de Oliveira |
| 2012/0210308 A1 | 8/2012 | Goetz et al. |
| 2012/0210320 A1 | 8/2012 | Goetz et al. |
| 2012/0272214 A1 | 10/2012 | Goetz et al. |
| 2012/0278797 A1 | 11/2012 | Secrist et al. |
| 2012/0311531 A1 | 12/2012 | Lebert |
| 2012/0317589 A1 | 12/2012 | Foti |
| 2013/0007706 A1 | 1/2013 | Burckart et al. |
| 2013/0125202 A1 | 5/2013 | Sprague et al. |
| 2013/0232469 A1 | 9/2013 | Agarwal |
| 2013/0339926 A1 | 12/2013 | Raundahl Gregersen et al. |
| 2014/0089907 A1 | 3/2014 | Cabillic et al. |
| 2014/0130020 A1 | 5/2014 | Boshernitsan et al. |
| 2014/0137075 A1 | 5/2014 | Said et al. |
| 2014/0173574 A1 | 6/2014 | Schmidt et al. |
| 2014/0189672 A1 | 7/2014 | Raundahl et al. |
| 2014/0237176 A1 | 8/2014 | Takefman et al. |
| 2014/0245275 A1 | 8/2014 | Elias et al. |
| 2014/0282441 A1 | 9/2014 | Hoban et al. |
| 2014/0351802 A1 | 11/2014 | Elias et al. |
| 2014/0358972 A1 | 12/2014 | Guarrieri et al. |
| 2015/0026703 A1 | 1/2015 | Foti |
| 2015/0089478 A1 | 3/2015 | Cheluvaraju et al. |
| 2015/0113172 A1 | 4/2015 | Johnson et al. |
| 2015/0186129 A1 | 7/2015 | Apte et al. |
| 2015/0331681 A1 | 11/2015 | Rose et al. |
| 2015/0363174 A1 | 12/2015 | Rose et al. |
| 2015/0378752 A1 | 12/2015 | Stoodley |
| 2016/0011982 A1 | 1/2016 | Sandoz et al. |
| 2016/0011992 A1 | 1/2016 | Sandoz et al. |
| 2016/0055014 A1 | 2/2016 | Gallimore et al. |
| 2016/0055344 A1 | 2/2016 | Peterson et al. |
| 2016/0062878 A1 | 3/2016 | Westrelin et al. |
| 2016/0087933 A1 | 3/2016 | Johnson et al. |
| 2016/0098346 A1 | 4/2016 | Pechanec et al. |
| 2016/0148013 A1 | 5/2016 | Taldo et al. |
| 2016/0154658 A1 | 6/2016 | Stoodley |
| 2016/0210445 A1 | 7/2016 | Deaver |
| 2016/0232017 A1 | 8/2016 | Raundahl Gregersen |
| 2016/0344745 A1 | 11/2016 | Johnson et al. |
| 2016/0357586 A1 | 12/2016 | Rose |
| 2017/0024188 A1 | 1/2017 | Buckley et al. |
| 2017/0024196 A1 | 1/2017 | Buckley et al. |
| 2017/0039043 A1 | 2/2017 | Haupt et al. |
| 2017/0063874 A1 | 3/2017 | Buckley et al. |
| 2017/0068520 A1 | 3/2017 | Buckley et al. |
| 2017/0269929 A1 | 9/2017 | Hegarty et al. |
| 2017/0272316 A1 | 9/2017 | Johnson et al. |

OTHER PUBLICATIONS

Reis et al., "A Module System for C++", Modules SG, Document No. N4047, May 27, 2014, pp. 1-22.

Rossberg et al., "Mixin Up the ML Module System", ACM Transactions on Programming Languages and Systems, vol. 35, No. 1, Article 2, Apr. 2013, pp. 2:1-2:84.

Trance, MacPhail, "Code Generation using Annotation Processors in the Java language—part 2: Annotation Processors", Available online at <https://deors.wordpress.com/2011/10/08/annotation-processors/>, Oct. 8, 2011, 14 pages.

Stack Overflow, "What's the difference between 'package' and 'module'" (last accessed on Dec. 6, 2016).

Oracle, "Interface Iterable<T>", Java Platform Standard Ed. 8, Available online at <http://docs.oracle.eom/javase/8/docs/api/java/lang/Iterable.html>, Copyright 1993, 2016, 3 pages.

Oracle, "Getting Started with the Annotation Processing Tool (apt)", Java, Available online at <http://docs.oracle.com/javase/1.5.0/docs/guide/apt/GettingStarted.html#AnnotationProcessor>, Copyright 2004, 2010, 8 pages.

Oracle and/or its Affiliate, Available online at <https://blogs.oracle.com/darcy/resource/ProjectCoin/CloseableFinder.java>, Copyright 2016, 3 pages.

(56) References Cited

OTHER PUBLICATIONS

NetBeans, "What is a module" (last accessed on Dec. 6, 2016).
Morling, Gunnar, "[Jigsaw] Getting "Bad Service Configuration File" Error with Annotation Processor", Available online at <http://mail.openjdk.java.net/pipermail/compiler-dev/2016-February/009985.html>, Feb. 9, 2016, 1 page.
McManus et al., "Plugging into the Java Compiler", JavaOne, 2014, 58 pages.
Hidalgo, Jorge, "JavaOne 2014—CON2013—Code Generation in the Java Compiler: Annotation Processors Do the Hard Work", Available online at <http://www.slideshare.net/deors/javaone-2014-con2013-code-generation-in-the-java-compiler-annotation-processors-do-the-hard-work>, Oct. 1, 2014, 11 pages.
Github, "jboss-logging", Available online at <https://github.eom/jboss-logging/jboss-logging-tools/blob/2.0.1.Final/processor/src/main/java/org/jboss/logging/processor/apl/LoggingToolsProcessor.java>, Copyright 2016, 3 pages.
Github, "Dagger 2", Google, Available online at <https://github.com/google/dagger/>, Copyright 2012, 3 pages.
Github, "Dagger 1", Square, Available online at <https://github.com/square/dagger>, Copyright 2012, 2 pages.
Darcy, Joseph D., "Properties via Annotation Processing", Oracle Weblog, Java, Available online at <https://blogs.oracle.com/darcy/entry/properties_via_annotationjDrocessing>, Sep. 2, 2009, 6 pages.
Darcy, Joseph D., "Project Coin: Bringing it to a Close(able)", Oracle Weblog, Java, Available online at<https://blogs.oracle.com/darcy/entry/project_coin_bring_close>, Jul. 6, 2010, 5 pages.
Darcy, Joseph D., "JSR 269 Maintenance Review for Java SE 8", Oracle Weblog, Java, Available online at <https://blogs.oracle.com/darcy/tags/annotationprocessing>, Dec. 8, 2013, 9 pages.
Buckley, Alex, "Project Jigsaw: Under the Hood", Java Platform Group, Oracle, Oct. 2015, 62 pages.
Breslav, Andrey, "kapt: Annotation Processing for Kotlin", Kotlin Blog, Available online at <http://blog.jetbrains.com/kotlin/2015/05/kapt-annotation-processing-for-kotlin/>, May 21, 2015, 8 pages.
Breslav, Andrey, "Better Annotation Processing: Supporting Stubs in kapt", Kellin Blog, Available online at <http://blog.jetbrains.com/kotlin/2015/06/betler-annotation-processing-supporting-stubs-in-kapt/>, Jun. 22, 2015, 6 pages.
Bracha et al., "Mirrors: Design Principles for Meta-level Facilities of Object-Oriented Programming Languages", OOPSLA '04 Proceedings of the 19th annual ACM SIGPLAN conference on Object-oriented programming, systems, Languages, and applications, Oct. 24-28, 2004, 14 pages.
Oracle, "The Java (Trademark) Tutorials", Java Documentation, Available online at <https://docs.oracle.com/javase/tutorial/ java/annotations/basics.html>, Copyright 1995, 2015, 2 pages.

* cited by examiner

METADATA APPLICATION CONSTRAINTS WITHIN A MODULE SYSTEM BASED ON MODULAR DEPENDENCIES

BENEFIT CLAIM; INCORPORATION BY REFERENCE

This application claims the benefit of U.S. Provisional Patent Appl. No. 62/395,893, filed Sep. 16, 2016, the entire contents of which are incorporated by reference as if set forth in their entirety.

TECHNICAL FIELD

The present disclosure relates to constraining the application of metadata to module elements within a module system. In particular, the present disclosure relates to metadata constraints based on (a) modular dependencies and (b) modular encapsulation.

RELATED APPLICATIONS; INCORPORATION BY REFERENCE

This application is related to (1) U.S. Pat. No. 7,499,956 titled "Annotation Processing From Source Files and Class Files", (2) U.S. patent application Ser. No. 14/808,590 titled "Composing a Module System and a Non-Module System"; filed Jul. 24, 2015, (3) U.S. patent application Ser. No. 14/847,800 titled "Restrictive Access Control for Modular Reflection"; filed Sep. 8, 2015, and (4) U.S. patent application Ser. No. 14/847,833 titled "Permissive Access Control for Modular Reflection"; filed Sep. 8, 2015, each of which is hereby incorporated by reference as if fully set forth herein.

BACKGROUND

Annotations are a form of metadata applied to elements of a program. Annotations may provide instructions to a compiler or a runtime environment. Annotations have a number of uses including but not limited to:
  a. Enforce semantics—Annotations can be used by a compiler to enforce semantics explicitly declared by a user.
  b. Information for the compiler—Annotations can be used by the compiler to detect errors or suppress warnings.
  c. Compile-time and deployment-time processing—Software tools can process annotations to generate, for example, code and XML files.
  d. Runtime processing—Some annotations are available to be examined at runtime.

Annotations may be accessed by various frameworks for code analysis, code evaluation, and/or code testing. Reflective Application Programming Interfaces (APIs) and supporting infrastructure may be used to access annotations attached to various class files, or other compiled representations or executable output. Executable output, as referred to herein, may correspond to the output of a Compiler or other tools that is intended to be executed by a Runtime Interpreter.

Annotations may be processed using annotation processors during compile-time and/or during runtime. Annotation processors may process annotations detected in source code, class files, or other compiled representations or executable output. As an example, annotation processors may process a first annotation(s), resulting in the production of new source files having further annotations that are to be iteratively processed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
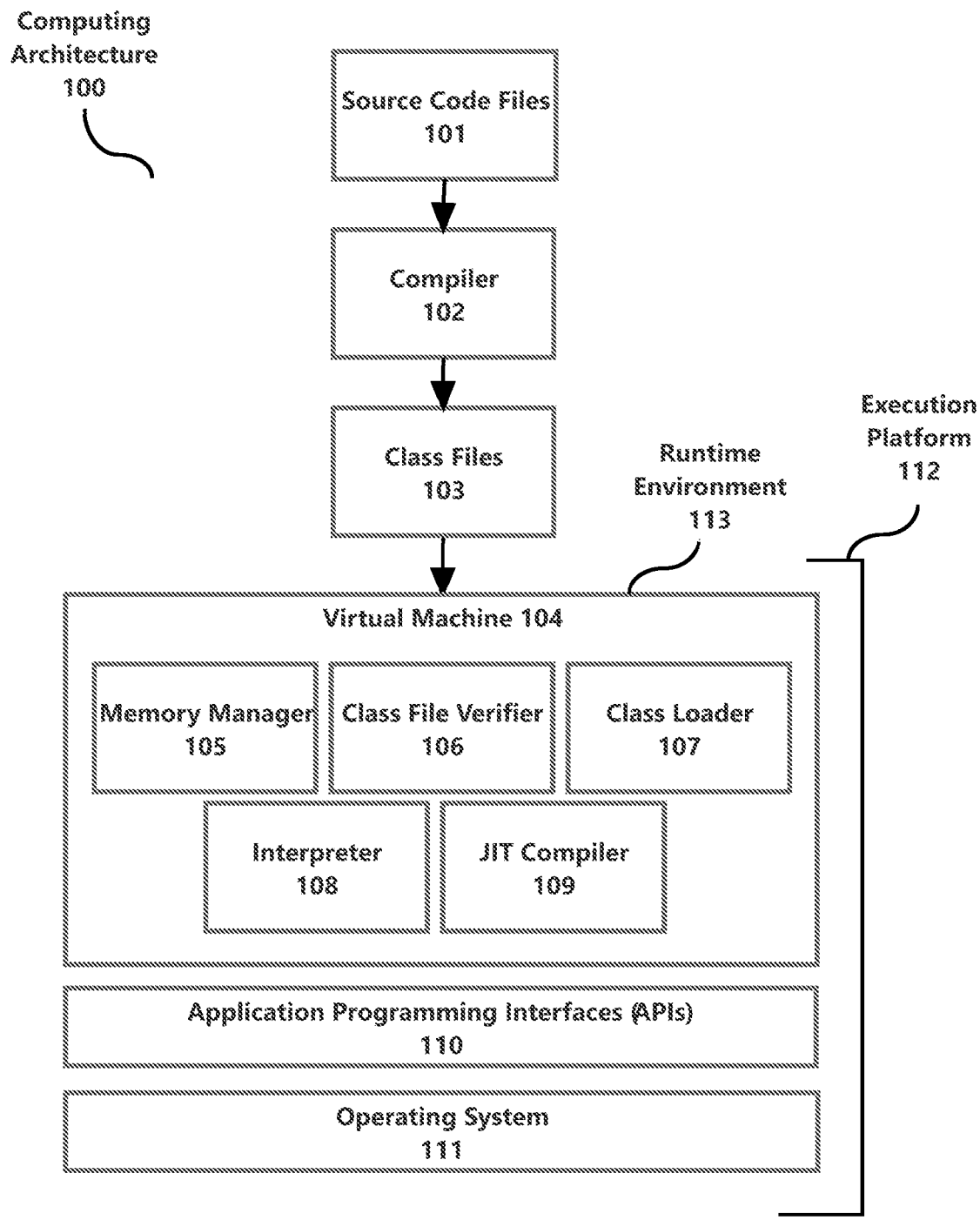
FIG. 1 illustrates a computing architecture in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. MODULE ELEMENTS IN A MODULE SYSTEM
4. ANNOTATIONS, ANNOTATION TYPES, AND META-ANNOTATIONS
5. CONSTRAINTS ON APPLICATION OF AN ANNOTATION BASED ON MODULAR ENCAPSULATION
6. CONSTRAINTS ON APPLICATION OF AN ANNOTATION BASED ON A KIND OF MODULE DEPENDENCY
7. SPLITTING MODULES BASED ON A CONFLICT IN DEPENDENCY CONSTRAINTS
8. MISCELLANEOUS; EXTENSIONS
9. HARDWARE OVERVIEW

1. General Overview

Embodiments include constraining application of an annotation to a module element based on modular encapsulation and/or modular dependencies.

In an embodiment, applicability of the annotation to a module element defined by a particular module is permitted only if the module element is accessible by other modules of the module system. Specifically, applicability of the annotation is permitted if the module element is exported to the other modules and declared with a public access modifier.

In an embodiment, applicability of the annotation to a module element defined by a particular module is permitted only if the module element is exported by the respective module descriptor to other modules, regardless of whether the module element is declared with a public access modifier or a non-public access modifier.

In an embodiment, applicability of the annotation to a module element defined by a particular module is permitted only if the module element is not exported by the respective module descriptor to any other module within the module system.

In an embodiment, applicability of the annotation to a module element defined by a particular module is permitted only if the respective module descriptor, of the particular module, declares a particular kind of dependency on another module which defines the annotation type of the annotation. Examples of the required kind of dependency include a compile-time dependency, a transitive dependency, and a dependency which matches specifications of other meta-annotations of the annotation type (e.g., retention policy).

In an embodiment, applicability of the annotation to a module element defined by a particular module is permitted only if the module descriptor, of the particular module, declares use of at least one implementation of the module element.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (1/0) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
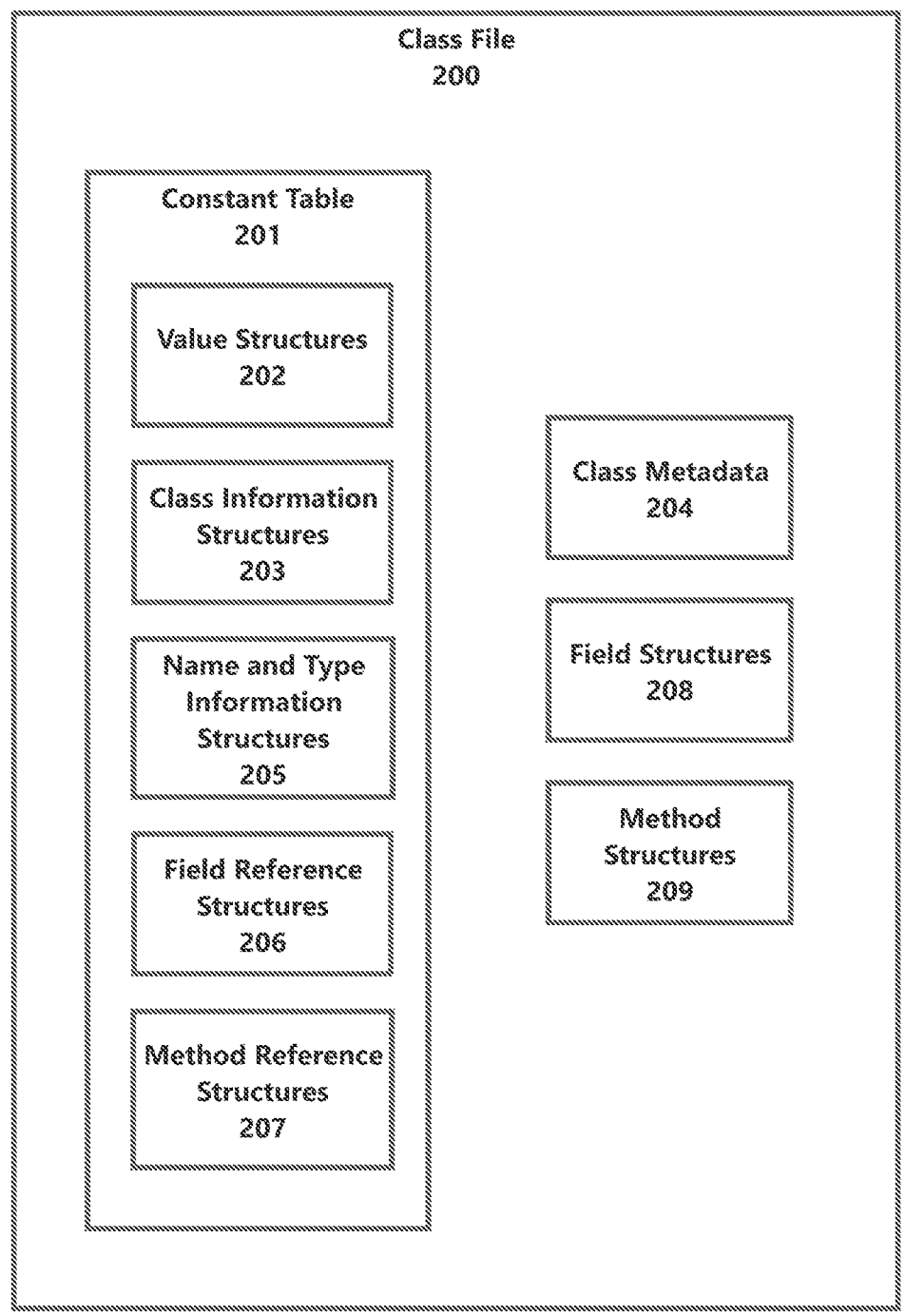
FIG. 2 is a block diagram illustrating a class file in accordance with one or more embodiments.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 is made up of class members including, but not limited to, a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, non-public, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, non-public, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, non-public, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
int add12and13( ) {
    return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
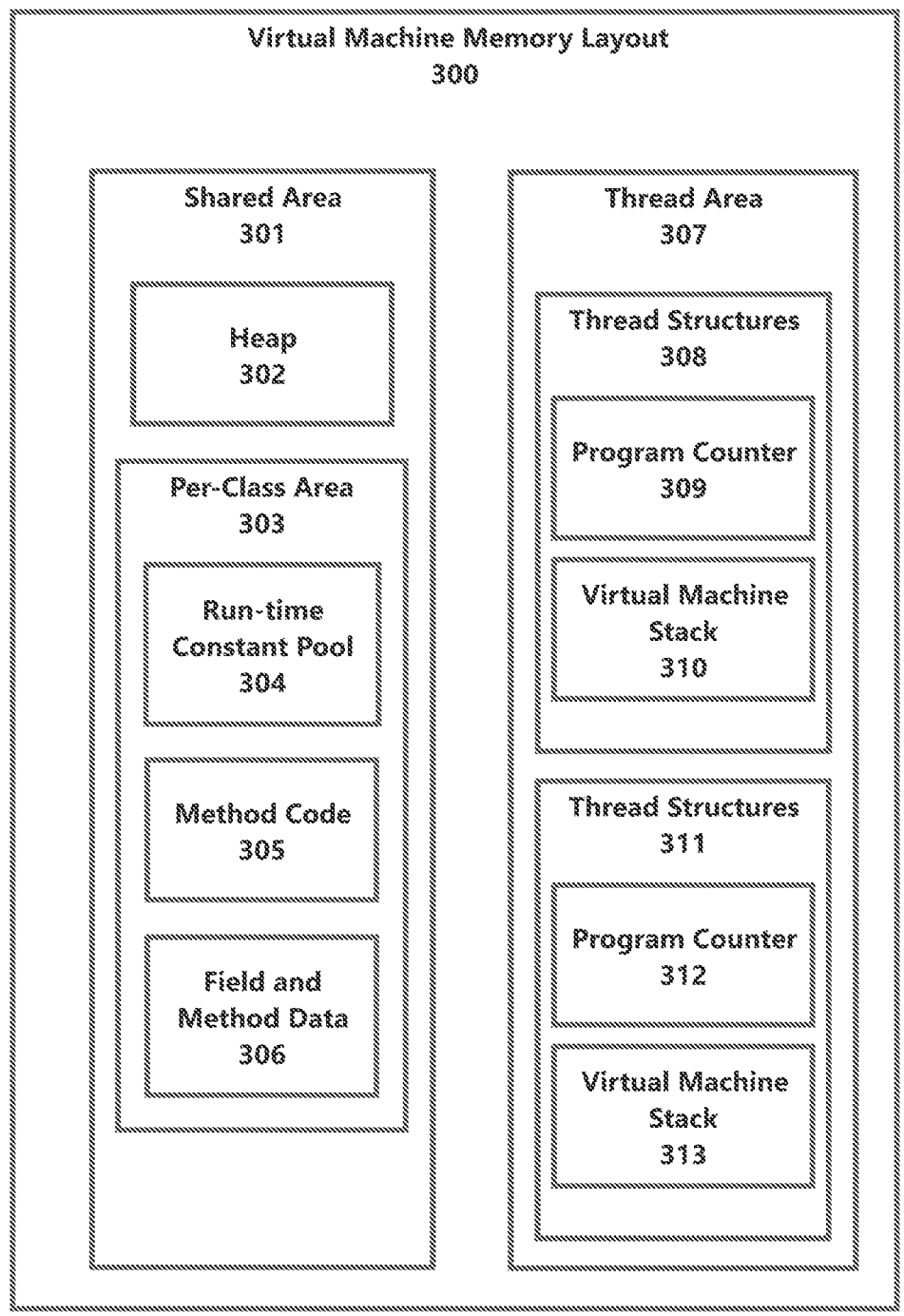
FIG. 3 illustrates a virtual machine memory layout in accordance with one or more embodiments.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the superclasses of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Module Elements in a Module System

One or more embodiments are applicable to a module system. Each module within a module system corresponds to a respective set of module code. Each module is associated with one or more module elements. A module element, as referred to herein, corresponds to a portion of the module code. A module element (portion of module) may itself include additional module elements (sub-portions of module).

Module systems implemented in different programming languages may be defined with different kinds of module elements. Some examples, described herein, refer to the specific module elements of a module in a Java Module System for purposes of explanation. However, embodiments are equally applicable to module elements of different kinds in module systems implemented in other programming languages.

In the Java Module System, each module includes one or more packages. Each package includes one or more classes. Each class includes one or more class members such as fields and methods. Methods, as referred to herein, include constructors which may be invoked for the creation of an object by instantiating classes. A module element, as referred to herein with respect to the Java Module System, may include a package, a class, or a class member.

Inter-module accessibility, dependencies, and/or interoperability may be determined based on a module descriptor. A module descriptor may describe, for example, which module elements of a particular module are exposed for access by other modules, and which other modules are required by the particular module. A module descriptor may declare that a module uses or provides implementations of a particular module element, the particular module element being defined by the same module or a different module. The module descriptor may be implemented by way of module declarations corresponding to each module within the module system.

Exposing Module Elements

In an embodiment, a module element of a particular module may or may not be exposed to another module. In the Java Module System, a package defined by a particular module may be exposed when a module descriptor, corresponding to the particular module, includes an "exports" expression with the package identified as a parameter. "Exposes" and "exports" may be used interchangeably herein. The package may be exported by the respective module descriptor to a set of specified modules (referred to as "qualified export"). The package may be exported by the respective module descriptor to all other modules in the module system (referred to as "unqualified export").

One or more embodiments relate to accessing module elements of a module in a module system. The module attempting the access is referred to herein as a consumer module and the module being accessed is referred to herein as a provider module. A module may function as either a consumer module or provider module for different access operations.

The module element, of a provider module, may be exposed to a consumer module by the provider module if any of a set of conditions are met. The set of conditions may include, but are not limited to (a) a declaration by the module descriptor, of the provider module, that exposes the module element to the consumer module via a qualified or unqualified export, (b) a user instruction received via an interface (e.g., a command line interface) requests a qualified or unqualified export, (c) a determination by the run-time environment based on detection of a triggering event associated with permissions for exposing the module element via a qualified or unqualified export, or (d) any other instruction that instructs a module system to expose the module element via a qualified or unqualified export. If instructions to export a module element do not specify a "qualified" export or an "unqualified" export, a default export kind may be configured and used.

A particular module element may be exposed by exposing of the particular module element itself or by exposing another module element which includes the particular module element. In one example, a class may be exposed by exposing a package which includes the class. Class members of the class are also exposed by exposing of the package which includes the class.

Access Modifiers for Module Elements

In an embodiment, a module element is declared with an access modifier. The access modifier identifies an accessibility configuration of the module element. The accessibility configuration declares that the module element is (a) publicly accessible or (b) not publicly accessible. In one example, the modifier "public" indicates that a module element is publicly accessible and the modifier "private" indicates that the module element is not publicly accessible.

Accessibility of a Module Element of a Particular Module by Other Modules within a Module System As noted above, a module element of a particular module may or may not be exported to other modules of the module system. Furthermore, a module element may be declared with a public access modifier or a non-public access modifier. If a module element, of a particular module, is both (a) exported to the other modules and (b) declared with a public access modifier, then the module element is accessible to other modules within a module system.

4. Annotations, Annotation Types, and Meta-Annotations

Annotations are a form of metadata applied to elements of a program. Annotations may be referred to as "directives". Examples herein which refer to annotations are equally applicable to any other type of metadata. Annotations are specifically recited only for purposes of clarity. Similarly, examples herein which refer to meta-annotations are equally applicable to any other type of meta-metadata (metadata for metadata).

Annotations may be applied to certain kinds of module elements defined by a module in a module system (described above). Module elements that may be annotated by annotations (i.e., module elements to which annotations may be 'applied') may include, but are not limited to classes, fields, methods, parameters, and other program elements.

Annotations may be used to direct a compiler or a runtime environment to perform checks on or operations associated with the module elements being processed by the compiler or runtime environment. Source code and/or a compiler's executable output may be read and in some cases, overwritten. Direct modification of source code and/or a compiler's executable output may or may not be possible, depending on the implementation. An annotation may be added in association with a module element by a developer. An annotation may be added by an annotation processor during the processing of another annotation. An annotation may be included in a class file by a compiler that compiles source code to generate the class file. The annotation, included in the class file, may or may not be based on an annotation in a source file that was compiled to generate the class file. An annotation corresponding to a module element may be included in the same file as the module element, adjacent or non-adjacent to the corresponding module element. A module element being annotated by an annotation may be identified based on a placement of an annotation in relation to the module element within a file. For example, any module element following an annotation may be determined to be corresponding to the annotation.

As noted above, annotations have a number of uses including but not limited to:
  a. Enforce semantics—Annotations can be used by a compiler to enforce semantics explicitly declared by a user.
  b. Information for the compiler—Annotations can be used by the compiler to detect errors or suppress warnings.
  c. Compile-time and deployment-time processing—Software tools can process annotations to generate, for example, code and XML files.
  d. Runtime processing—Some annotations are available to be examined at runtime.

A variety of different symbols, keywords, or special characters may be used to identify annotations. Examples described herein may reference specific symbols, keywords, or special characters (e.g., '@') which should not be construed as limiting the scope of any of the claims.

As an example, an annotation may be expressed as:
  @Entity

The at sign character (@) indicates to a compiler (or other code/program) that what follows is an annotation. In the following example, the annotation @Override annotates a module element, the method mySuperMethod( ) which immediately follows the annotation:
  @Override
  void mySuperMethod( ) { ... }

The annotation may include elements with corresponding values. As an example, an annotation @Author may include the elements name and date with corresponding values as noted below. The annotation @Author may annotate a module element, a class myClass( ).

```
@Author(
    name = "Benjamin Franklin",
    date = "3/27/2003"
)
class MyClass( ) { ... }
```

As another example, an annotation @SuppressWarnings may include an element status with a corresponding named value as noted below. The annotation @SuppressWarnings may annotate a module element, a method myMethod( ).
  @SuppressWarnings (status="unchecked")
  void myMethod( ) { ... }

Each annotation is of a corresponding type, referred to herein as an annotation type. The annotation type of an annotation defines the elements of the annotation. An element of an annotation is defined to have a name (e.g., status) and a type (e.g., String). The annotation type may be defined using an annotation type declaration. As an example, the element status of the above annotation @SuppressWarnings may be defined by the following annotation type:

```
public @interface SuppressWarnings {
    String status( );
}
```

Meta-annotations, as referred to herein, include any annotations that annotate an annotation type's declaration. Use and/or application of annotations of the annotation types is determined based on the meta-annotations that annotate the annotation type's declaration. Examples of meta-annotations in the java.lang.annotation package of the Java API include the following:
  a. @Documented—indicates that whenever the annotation is used those elements should be documented using the Javadoc tool.
  b. @Inherited—indicates that the annotation type can be inherited from the super class (this is not true by default). When the user queries the annotation type and the class has no annotation for this type, the class' superclass is queried for the annotation type. This annotation applies only to class declarations.
  c. @Repeatable—indicates that the annotation can be applied more than once to the same declaration or type use.
  d. @Retention—specifies how the annotation is stored:
    i. RetentionPolicy.SOURCE—The annotation is retained only in the source level and is ignored by the compiler.
    ii. RetentionPolicy.CLASS—The annotation is retained by the compiler at compile time, but is ignored by a runtime environment (e.g., the Java Virtual Machine).
    iii. RetentionPolicy.RUNTIME—The annotation is retained by the JVM so it can be used by the runtime environment.
  e. @Target—restrict the applicability of the annotation to particular module elements. Examples include:
    i. ElementType.ANNOTATION_TYPE—The annotation can be applied to an annotation type.
    ii. ElementType.CONSTRUCTOR—The annotation can be applied to a constructor.
    iii. ElementType.FIELD—The annotation can be applied to a field or property.
    iv. ElementType.LOCAL_VARIABLE—The annotation can be applied to a local variable.
    v. ElementType.METHOD—The annotation can be applied to a method.
    vi. ElementType.PACKAGE—The annotation can be applied to a package declaration.
    vii. ElementType.PARAMETER—The annotation can be applied to the parameters of a method.

viii. ElementType.TYPE—The annotation can be applied to a class or interface, including an annotation type.

As an example, the @Documented meta-annotation may be applied to an annotation type as follows:

```
@Documented
public @interface Author {
    String name( );
    String date( );
}
```

Whenever the annotation @Author, of the above annotation type, is applied to a class declaration, the annotation should appear in the javadoc for the class declaration.

5. Constraints on Application of an Annotation Based on Modular Encapsulation

Figure 4A:
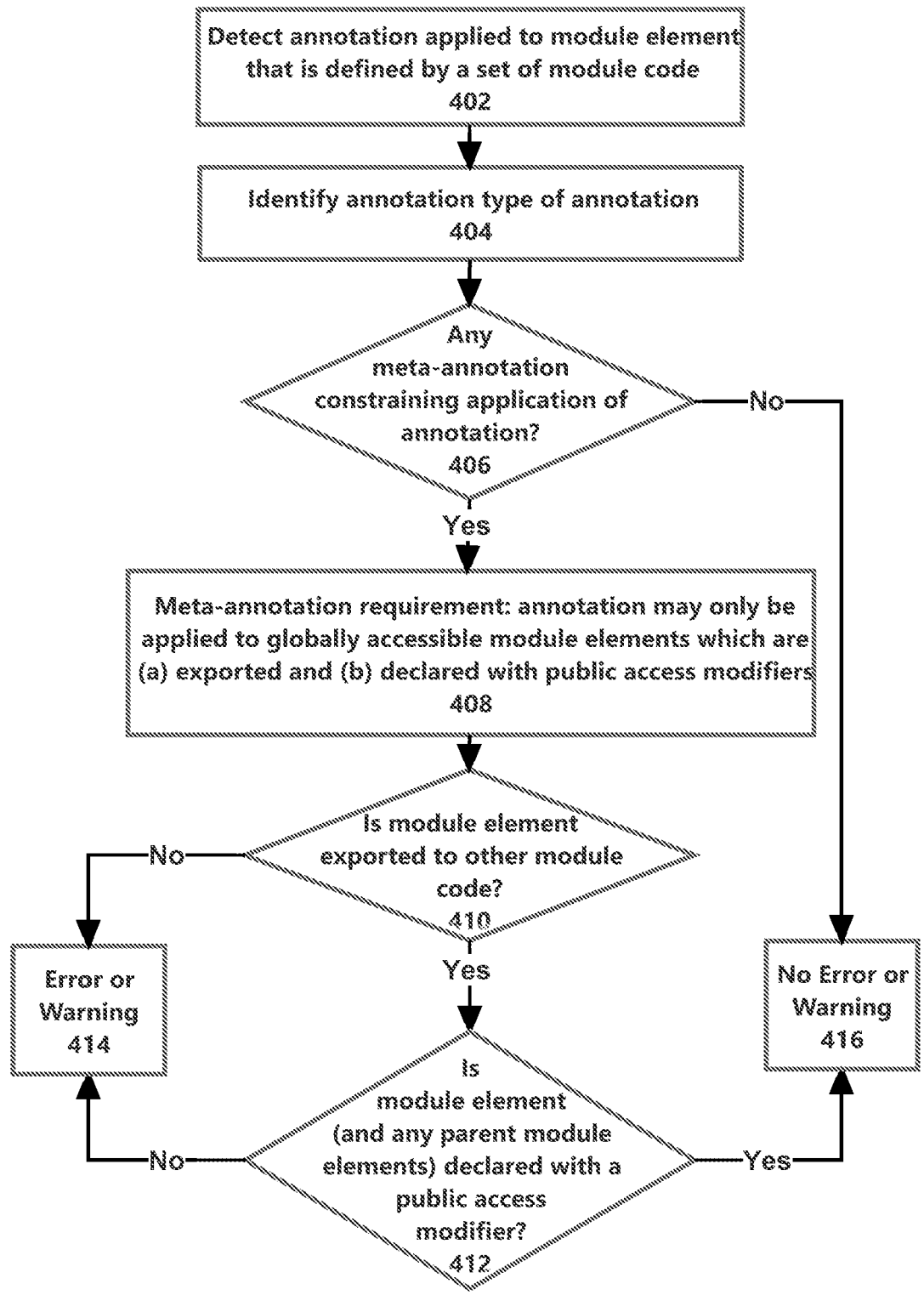
FIGS. 4A, 4B, 5A, and 5B illustrate operations for constraining applicability of an annotation based on modular encapsulation in accordance with one or more embodiments.

FIG. 4A illustrates an example set of operations for constraining the application of an annotation based on modular encapsulation, in accordance with one or more embodiments. One or more operations illustrated in FIG. 4A may be modified, rearranged, or omitted all together. Accordingly, the particular sequence of operations illustrated in FIG. 4A should not be construed as limiting the scope of one or more embodiments.

Initially, a compiler detects an annotation applied to a module element that is defined by a set of module code in a module system (Operation 402). The compiler may detect the annotation during a compilation process. Compilation processes are described above in detail. Detecting the annotation may include detecting a symbol or keyword corresponding to annotations. Different programming languages may define different symbols or keywords to signal annotations. In an example, an '@' symbol may signal an annotation. The compiler may determine @Entity is an annotation in response to detecting the '@' symbol in the annotation @Entity.

The module element to which the annotation applies may be identified based on the rules of the programming language. The module element may be identified based on a placement of the module element in relation to the annotation. In an example, the module element following the annotation is determined to be the module element annotated by the annotation. If the module element following the annotation is itself an annotation, then the next module element is identified until a module element that is not an annotation is identified. The first identified module element following an annotation, that is not itself an annotation, is determined to be the module element that is the subject of the annotation. Examples of module elements annotated by one or more annotations are described above.

In an embodiment, the compiler determines the annotation type of the annotation (Operation 404). Determining the annotation type may include searching for the annotation type in one or more packages imported by a set of code which recites the annotation. Continuing the above example, a set of code recites the annotation @Entity. In response to detecting the annotation @Entity, the compiler searches for the annotation type Entity in module elements accessible to the set of code that recites the annotation @Entity. The compiler may search for the annotation type Entity within the same set of code that recites the annotation @Entity. Furthermore, the compiler may search for the annotation type Entity within packages imported by the set of code that recites the annotation @Entity. Detecting a particular annotation type may include detecting a symbol or keyword corresponding to annotation types. Different programming languages may define different symbols or keywords to signal annotations. In an example, '@interface' symbol may signal an annotation type. The compiler may determine public @interface Entity { . . . } is a declaration of an annotation type in response to public @interface Entity { . . . } including '@interface'.

Once the annotation type, of the annotation applied to the module element, is identified, then the compiler determines whether there are any meta-annotations annotating the declaration of the annotation type which constrain application of the annotation (Operation 406). Identifying meta-annotations is similar to identifying annotations. Meta-annotations for an annotation type's declaration may be identified based on a placement of the meta-annotations in relation to the annotation type's declaration. In an example, any annotations that precede an annotation type's declaration may be determined to be meta-annotations. Meta-annotations may be represented using the same symbol or keyword as annotations (e.g., '@'), or a different symbol or keyword (e.g., '^^^').

Generally, meta-annotations may or may not constrain the application of an annotation. FIG. 4A illustrates one or more embodiments in which meta-annotations constrain the applicability of an annotation based on modular encapsulation. Modular encapsulation relates to the encapsulation of module elements within a particular module ("set of module code"). The type of encapsulation controls accessibility to the module elements from other modules ("other sets of module code").

In an embodiment, a meta-annotation of an annotation type's declaration may require that any annotation of that annotation type only be applied to globally accessible module elements (Operation 408). As an example, the meta-annotation may be expressed as @Target (ElementType.EXPORTED_PUBLIC). Globally accessible module elements, as referred to herein, include module elements that are accessible by all modules within a module system.

Accessibility of a module element of the particular module by other modules may be determined as a function of various factors. The factors include but are not limited to (a) whether the module element of the particular module is exported to the other modules by the respective module descriptor of the particular module and (b) whether the module element is declared with a public access identifier or a non-public access identifier. A module element defined by a set of module code is accessible by other module code within a module system if (a) the module element is exported to the other module code by the respective module descriptor of the set of module code (Operation 410) and (b) the module element (and any parent module elements thereof) are declared with a public access modifier (Operation 412).

A module element, defined by a set of module code, may be exported to other module code via an unqualified export by the respective module descriptor of the set of module code. Specifically, the module descriptor may declare an unqualified export of the module element to export the module element to the other module code in the module system. Accordingly, the module descriptor may be examined to determine whether or not the module element (or any package that includes the module element) has been exported to the other module code in the module system.

A parent module element, of a particular module element, is any module element which directly or indirectly includes the particular module element. The particular module element may be referred to as a child module element in relation to the parent module element. The parent module element may be a class which includes another module element which is a field within the class (parent module element directly includes the child module element). The parent module element may be a package which includes a class which includes another module element which is a field within the class (parent module element indirectly includes the child module element). As described above, an access modifier may be declared with module elements. Access modifiers may be declared with a module element and any parent module elements thereof. Examples of access modifiers include public access modifiers and non-public access modifiers (e.g., "private").

If the module element of the set of module code is exported to other module code and the module element (including any parent module elements thereof) is declared with a public access modifier, then no error or warning is displayed with regard to the application of the annotation to the module element (Operation 416). As is understood by a person skilled in the art, other errors may still be displayed. If either the module element is not exported to the other module code or the module element (or any parent module element thereof) is declared with a non-public access modifier, then an error or warning is displayed with regard to the application of the annotation to the module element (Operation 414). The error or warning if displayed may be, for example, a compiler error presented by a compiler. The compiler error may be presented in response to a request to compile code which includes the annotation and the module element. The compiler error may prevent successful compilation of the code. The compiler error may prevent application of the annotation to the module element.

In an example, the declaration of an annotation type Web Service may be annotated with a meta-annotation @Target (ElementType.EXPORTED_PUBLIC):

```
@Target(ElementType.EXPORTED_PUBLIC)
public @interface WebService { ... }
package com.user.foo;
@WebService
public class CustomerOrder { ... }
```

The package com.user.foo must be exported in order for @WebService to be applicable to the public class CustomerOrder. If com.user.foo is not exported, then @WebService is not applied to the public class.

The meta-annotation described above, with reference to FIG. 4A, may be combined with any other meta-annotations. For example, in addition to requiring that the module element be exported and declared with a public access modifier, the meta-annotation may require that the module element correspond to a field. Multiple targets may be expressed at once via { . . . } syntax. As an example, the meta-annotation may be expressed as @Target({Element-Type.FIELD, ElementType.EXPORTED_PUBLIC).

Figure 4B:
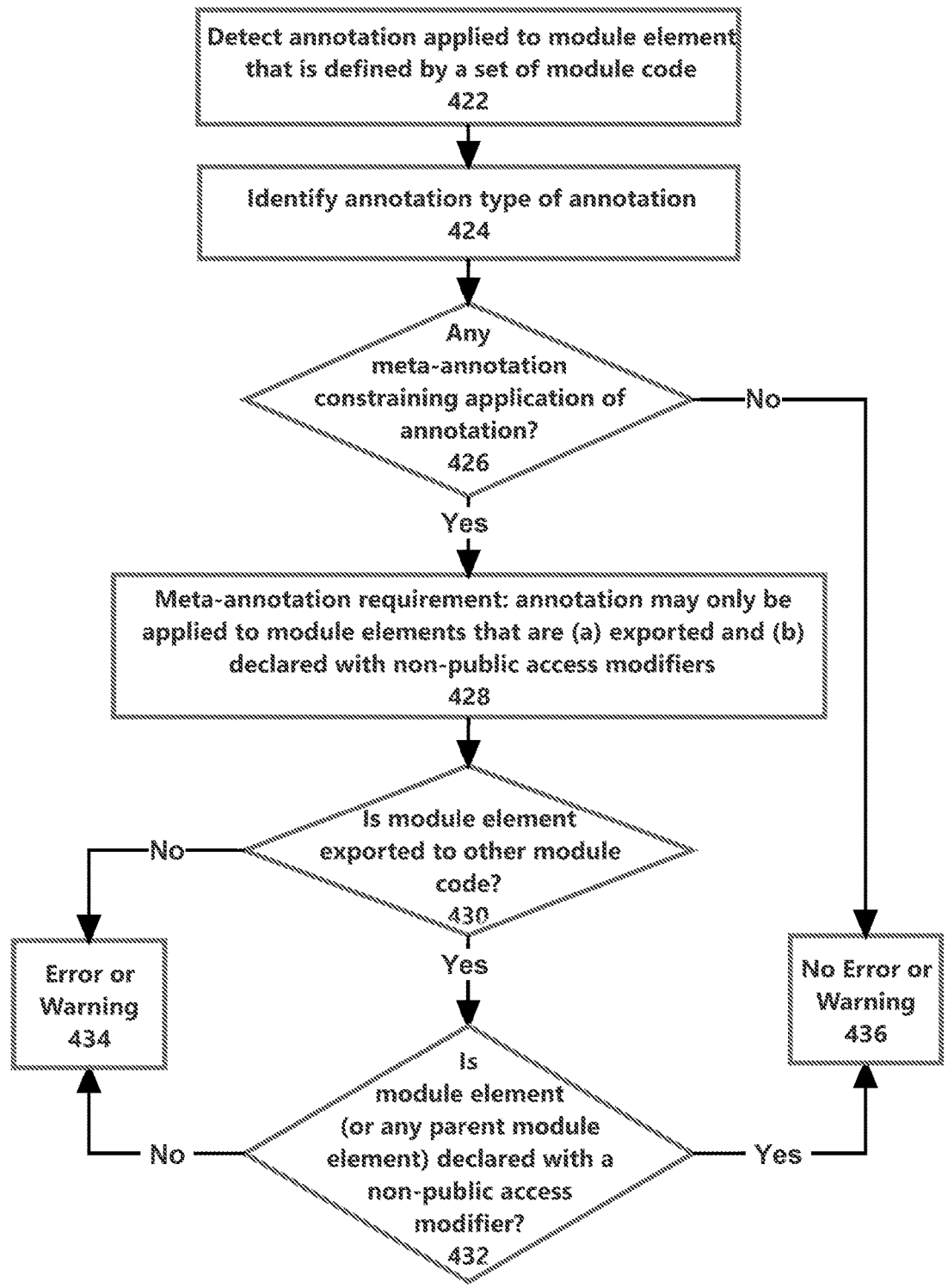

FIG. 4B illustrates an example set of operations for constraining the application of an annotation based on modular encapsulation, in accordance with one or more embodiments. One or more operations illustrated in FIG. 4B may be modified, rearranged, or omitted all together. Accordingly, the particular sequence of operations illustrated in FIG. 4B should not be construed as limiting the scope of one or more embodiments.

Operations 422-426 of FIG. 4B are essentially similar to operations 402-406, respectively, of FIG. 4A. Operations 402-406 are described above. Accordingly, operations 422-426 are not further described.

In an embodiment, a meta-annotation of an annotation type's declaration may require that any annotation of that annotation type only be applied to module elements that are (a) exported and (b) declared with without a non-public access modifiers (Operation 428). As an example, the meta-annotation may be expressed as @Target(ElementType.EXPORTED_NONPUBLIC). This meta-annotation may be used, for example, for annotation types whose annotations are expected to apply to types that support the implementation of an API. When a package is exported so that the public types of the package can be used as an API by developers, the package often includes non-public types with code that is inherited or accessed by the public types.

In an example, the java.lang package is exported by the java.base module. There are many well known public types in java.lang including, but not limited to, Object, String, and System. There are also non-public types in java.lang, e.g., the package-private AbstractStringBuilder which exists for the purpose of declaring public methods that are inherited by public subclasses in java.lang, StringBuffer and StringBuilder.

A determination is made as to whether the module element has been exported to other module code (Operation 430). If the module element has not been exported, then an error or warning is presented (Operation 434). Operation 434 is similar to Operation 414 described above.

If the module element has been exported, then a further determination is made as to whether the module element is declared with a non-public access modifier (Operation 432). If the module element is declared with a non-public access modifier, then no error or warning is presented (Operation 436). Operation 436 is similar to operation 416 described above. If the module element is not declared with a non-public access modifier, then an error or warning is presented (Operation 434). Operation 434 is similar to operation 414 described above.

Figure 5A:
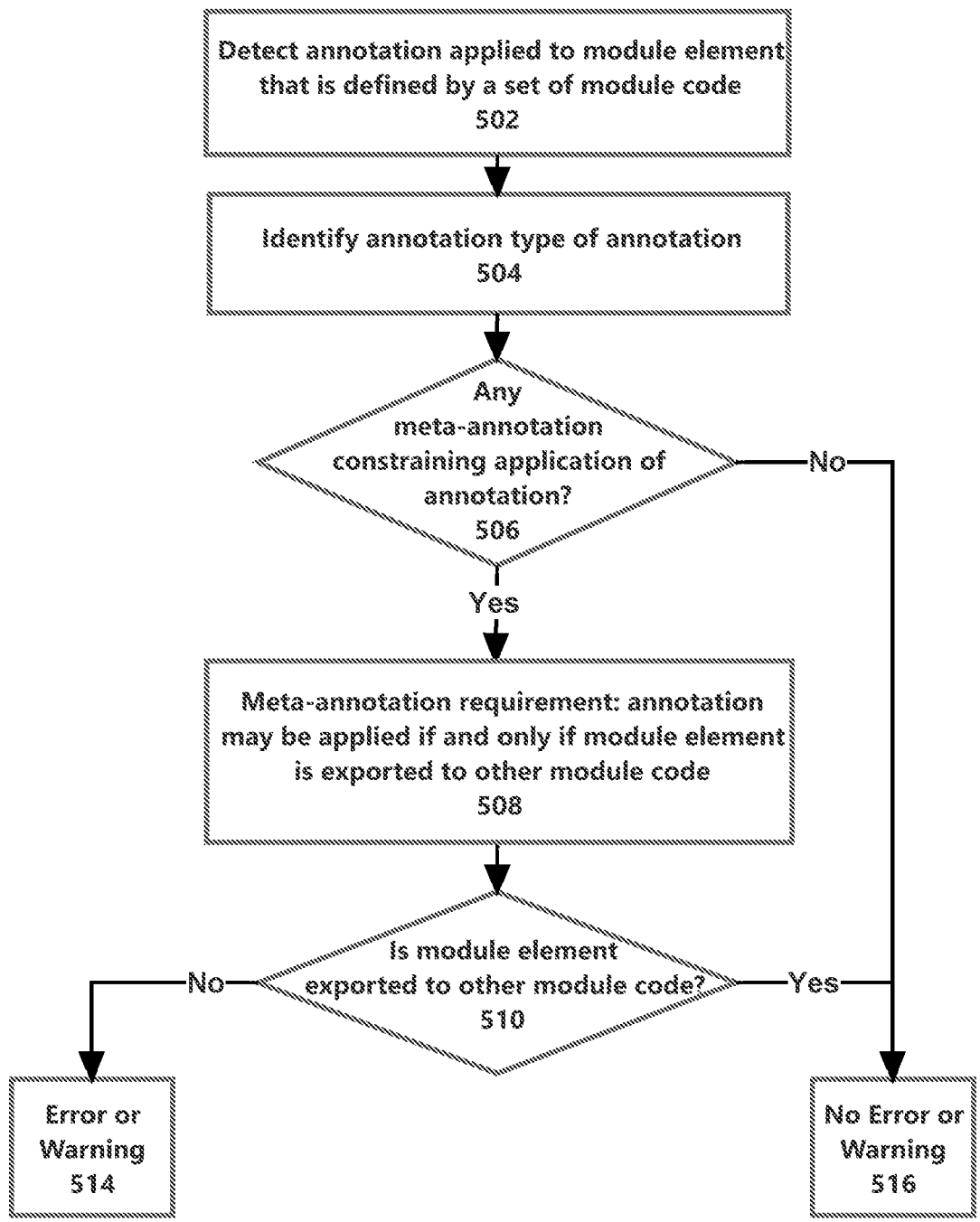
Figure 5B:
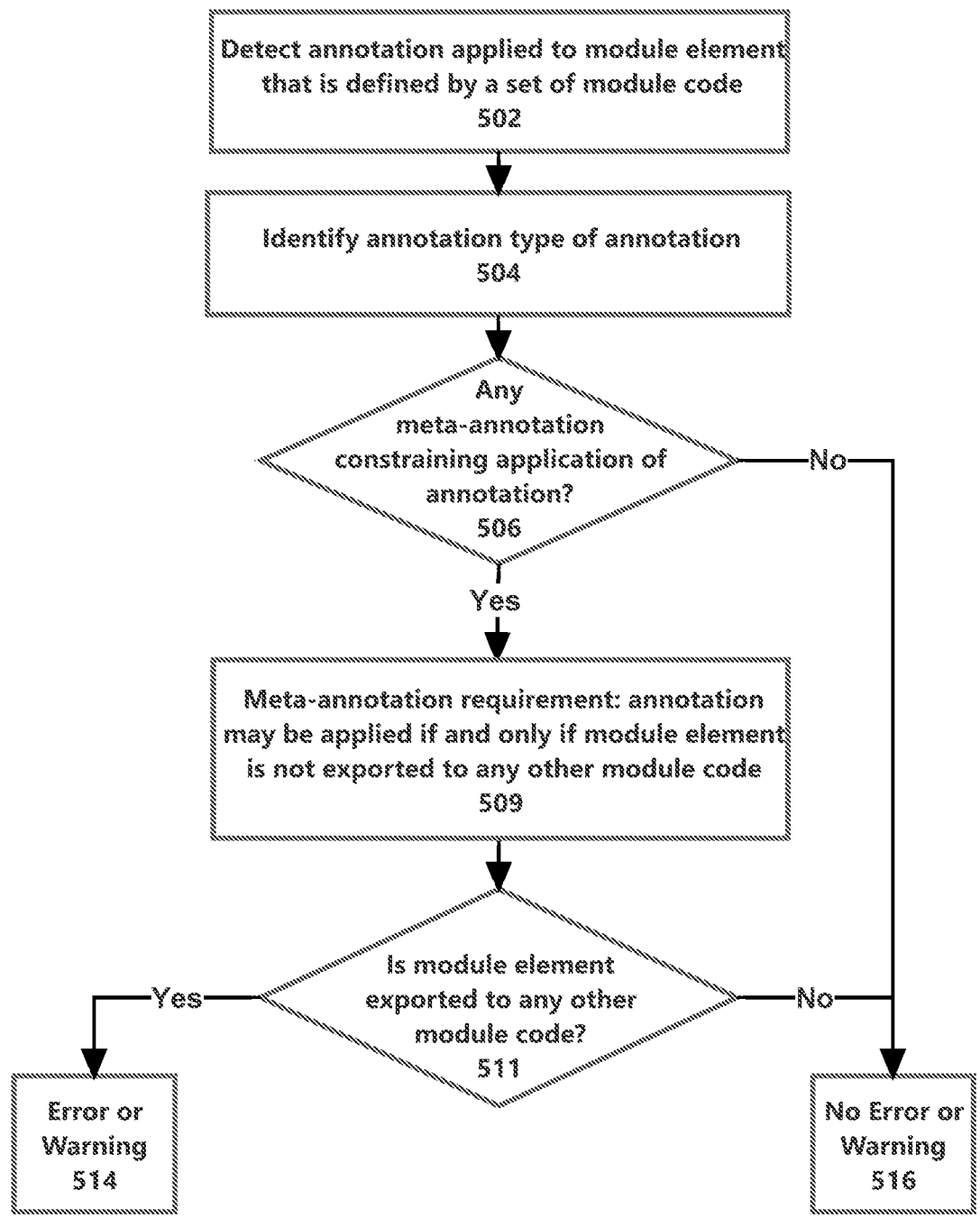

FIGS. 5A and 5B illustrate example sets of operations for constraining the application of an annotation based on modular encapsulation, in accordance with one or more embodiments. One or more operations illustrated in FIGS. 5A and 5B may be modified, rearranged, or omitted all together. Accordingly, the particular sequence of operations illustrated in FIGS. 5A and 5B should not be construed as limiting the scope of one or more embodiments.

Operations 502-506 of FIG. 5A are essentially similar to operations 402-406 of FIG. 4A. Operations 402-406 are described above. Accordingly, operations 502-506 are not further described.

In an embodiment, a meta-annotation of an annotation type's declaration may require that any annotation of that annotation type may be applied to a module element defined by a set of module code if and only if the module element is exported by the respective module descriptor to the other module code (Operation 508). This meta-annotation does not require that the module element be declared with a public access modifier or a non-public access modifier for application of the annotation to the module element. Accordingly, in at least one embodiment, the type of access modifier declared for a module element is irrelevant to whether an annotation may be applied to the module element. As an example, the meta-annotation may be expressed as @Target ({ElementType.EXPORTED_NONPUBLIC, ElementType.EXPORTED_PUBLIC}). Alternatively, a single meta-annotation may be expressed as @Target(ElementType.EXPORTED).

Based on the meta-annotation requirement, a compiler may determine whether the module element of the set of module code has been exported to the other module code (Operation 510). A module element, defined by a set of module code, may be exported to the other module code via an unqualified export by the respective module descriptor. Specifically, the module descriptor may declare an export of the module element. Accordingly, the module descriptor may be examined to determine whether or not the module element (or any package that includes the module element) has been exported to the other module code in the module system.

In an embodiment, an error/warning is shown or not shown based on whether the module element has been exported to the other module code (regardless of whether the module element has been declared with a public access modifier or a non-public access modifier). For a meta-annotation which requires an export to the other module code, an error or warning is presented (Operation 514) if the module element is not exported to the other module code. The error or warning is not presented (Operation 516) if the module element is exported to the other module code. Operations 514 and 516 are essentially similar to operations 414 and 416, respectively.

FIG. 5B includes operations 502-506 of FIG. 5A. However, FIG. 5B illustrates a different meta-annotation requirement than FIG. 5A. FIG. 5B illustrates a meta-annotation that specifies: the annotation may be applied to the module element defined by a set of module code if and only if the module element is not exported, to any other sets of module code, by the respective module descriptor (regardless of whether the module element has been declared with a public access modifier or a non-public access modifier) (Operation 509). A module element that is not exported to any other sets of module code by the respective module descriptor is referred to herein as a concealed module element. If the module element is exported to any other sets of module code (e.g., via a qualified export or via an unqualified export), then an error or warning is presented with regard to the application of the annotation to the module element (Operations 511, 514). If the module element is not exported to any other sets of module code (e.g., via a qualified export or via an unqualified export), then no error or warning is presented with regard to the application of the annotation to the module element (Operations 511, 516). As an example, the meta-annotation requiring application of the annotation to concealed module elements (as described above with relation to FIG. 5B) may be expressed as @Target(ElementType.CONCEALED).

Figure 6:
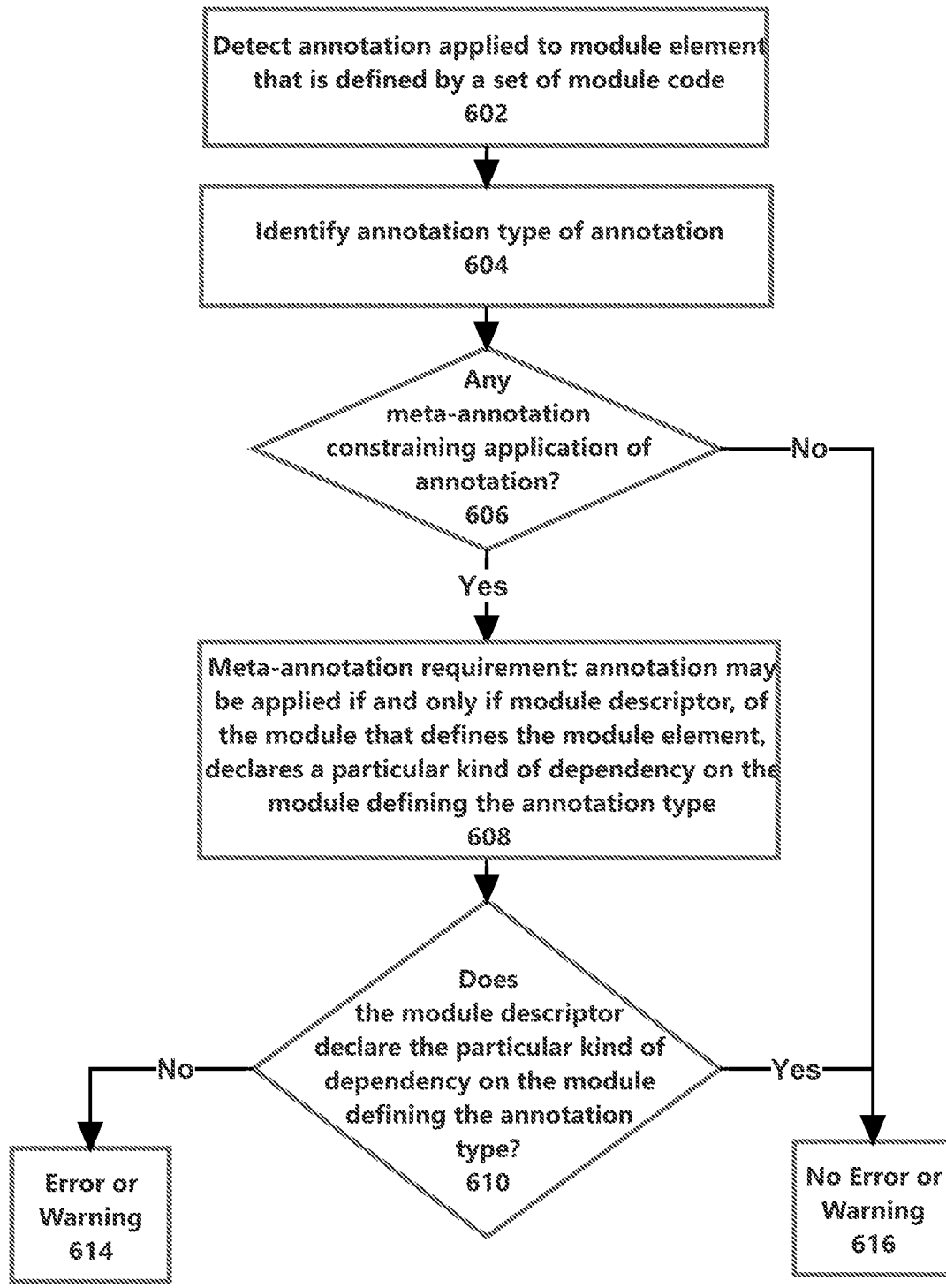
FIG. 6 illustrates operations for constraining applicability of an annotation based on modular dependencies in accordance with one or more embodiments.

6. Constraints on Application of an Annotation Based on a Kind of Module Dependency FIG. 6 illustrates an example set of operations for constraining the application of an annotation based on modular dependencies, in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

Operations 602-606 of FIG. 6 are essentially similar to operations 402-406 of FIG. 4A. Operations 402-406 are described above. Accordingly, operations 602-606 are not further described.

In an embodiment, a meta-annotation of an annotation type's declaration may require that any annotation of that annotation type may be applied to a module element if and only if the module, that defines the module element, declares a particular kind of dependency on the module defining the annotation type (Operation 608). The meta-annotation may require one or more of various kinds of dependencies by (a) a consumer module defining a module element to (b) a provider module defining the annotation type of the annotation applied to the module element. The kind of dependency that may be specified by a meta-annotation, in accordance with one or more embodiments, is not limited to the specific kinds of dependencies described herein.

As an example, the meta-annotation may require a compile-time dependency that is in effect at compile-time and is not in effect at runtime. A compile-time dependency is a dependency specified in source code that is represented in compiled code (e.g., class files) used by the runtime environment. Specific language (e.g., "requires static") may be used for declaring a dependency at compile-time that is not applicable at runtime. A compile-time dependency requirement by a meta-annotation may require that (a) a module descriptor, of the module defining the module element, declare a compile-time dependency (that is not applicable at runtime) on (b) the module defining the annotation type of the annotation that annotates the module element. As an example, the meta-annotation requiring the compile-time dependency may be expressed as @Target(ElementType.TYPE_FROM_STATIC_DEPENDENCY).

As another example, the meta-annotation may require a transitive dependency. A transitive dependency is a dependency which is transferred from a particular module (that declares the transitive dependency) to any other module which depends on the particular module. In an example, a module descriptor, of a first module, declares a transitive dependency on a second module. A module descriptor, of a third module, declares a dependency on the first module without declaring a dependency on the second module. However, the third module also depends on the second module. The module system generates the dependency on the second module by the third module in response to detecting (a) the dependency declaration by the module descriptor of the third module on the first module and (b) the transitive dependency on the second module by the module descriptor of the first module. Specific language (e.g., "requires transitive") may be used for declaring a transitive dependency. A transitive dependency requirement by a meta-annotation may require that a module descriptor, of the module defining the module element, declare a transitive dependency on the module defining the annotation type of the annotation that annotates the module element. As an example, the meta-annotation requiring a transitive dependency may be expressed as @Target(ElementType.TYPE_FROM_TRANSITIVE_DEPENDENCY).

As another example, the meta-annotation may require a kind of dependency that is aligned with other meta-annotations that annotate the declaration of the annotation type of the annotation. The meta-annotation may require a dependency that matches a retention policy specified for annotations of the annotation type's declaration. As an example, the meta-annotation requiring a dependency that matches the retention policy specified for annotations of the annotation type's declaration may be expressed as @Target(ElementType.TYPE_FROM_DEPENDENCY_MATCHING_RETENTION_POLICY). The meta-annotation @Retention specifies how an annotation is stored. The meta-annotation @Retention (RetentionPolicy.Source) indicates that the annotation, of the annotation type whose declaration is annotated by the meta-annotation, is retained only in the source level and is ignored by the compiler. In other words, the annotation is not included in the class files generated by the compiler. When the meta-annotation @Retention(RetentionPolicy.Source) annotates an annotation type's declaration, then a dependency on the module defining the annotation type may only be needed during compile-time, not during runtime. Based on the meta-annotation @Retention (RetentionPolicy.Source) annotating an annotation type's declaration, an @Target meta-annotation may require that a corresponding compile-time dependency be declared by (a) a module defining the module element on (b) the module defining the annotation type of the annotation that is applied to the module element.

As described above with reference to Operation 608, the meta-annotation may require a particular kind of dependency. The particular kind of dependency may be statically specified or may depend on other meta-annotations that annotate a declaration of an annotation type. Now continuing with FIG. 6, the compiler determines whether the module descriptor, of the module that defines the module element, declares the particular kind of dependency on the module defining the annotation type as is required by the meta-annotation (Operation 610). Determining whether the particular kind of dependency, as is required by the meta-annotation, is declared includes determining whether the dependency declaration, by the module descriptor, includes the language that matches the particular kind of dependency. For example, when a compile-time dependency is required by the meta-annotation, then the dependency declaration is checked to ensure "requires static" (or other language corresponding to a compile-time dependency) is recited. When runtime dependency is required by the meta-annotation, then the dependency declaration is checked to ensure "requires" is recited without "static".

In an embodiment, an error/warning is shown or not shown based on whether the module, that defines the module element, declares the particular kind of dependency on the module defining the annotation type as is required by the meta-annotation. Lack of the particular kind of dependency required by the meta-annotation results in the compiler displaying an error or a warning (Operation 614). If the particular kind of dependency required by the meta-annotation is declared, then the error or warning is not presented (Operation 616). Operations 614 and 616 are essentially similar to operations 414 and 416, respectively.

7. Splitting Modules Based on a Conflict in Dependency Requirements

As noted in the above section, a meta-annotation may require a particular kind of dependency be declared by (a) a module descriptor of a first module defining a module element on (b) a second module defining the annotation type of an annotation that annotates the module element.

In a particular scenario, at least two module elements in the first module may be annotated by two respective annotations. The two annotations may be of two respective annotations types defined in the second module. Respective meta-annotations of the two annotation types' declarations defined by the second module may require different, conflicting dependencies to be declared by the module descriptor of the first module on the second module. In an embodiment, when multiple conflicting dependencies are required by meta-annotations based on two annotated module elements defined by the first module, then the first module is split into two or more modules. The first module is split such that the module elements corresponding to the conflicting dependencies are defined by different modules post-split. Each of the module descriptors of the post-split modules may then declare a dependency on the second module in accordance with the meta-annotations that annotate the declaration of the annotation type of the respective annotations of the respective module elements in the different post-split modules.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
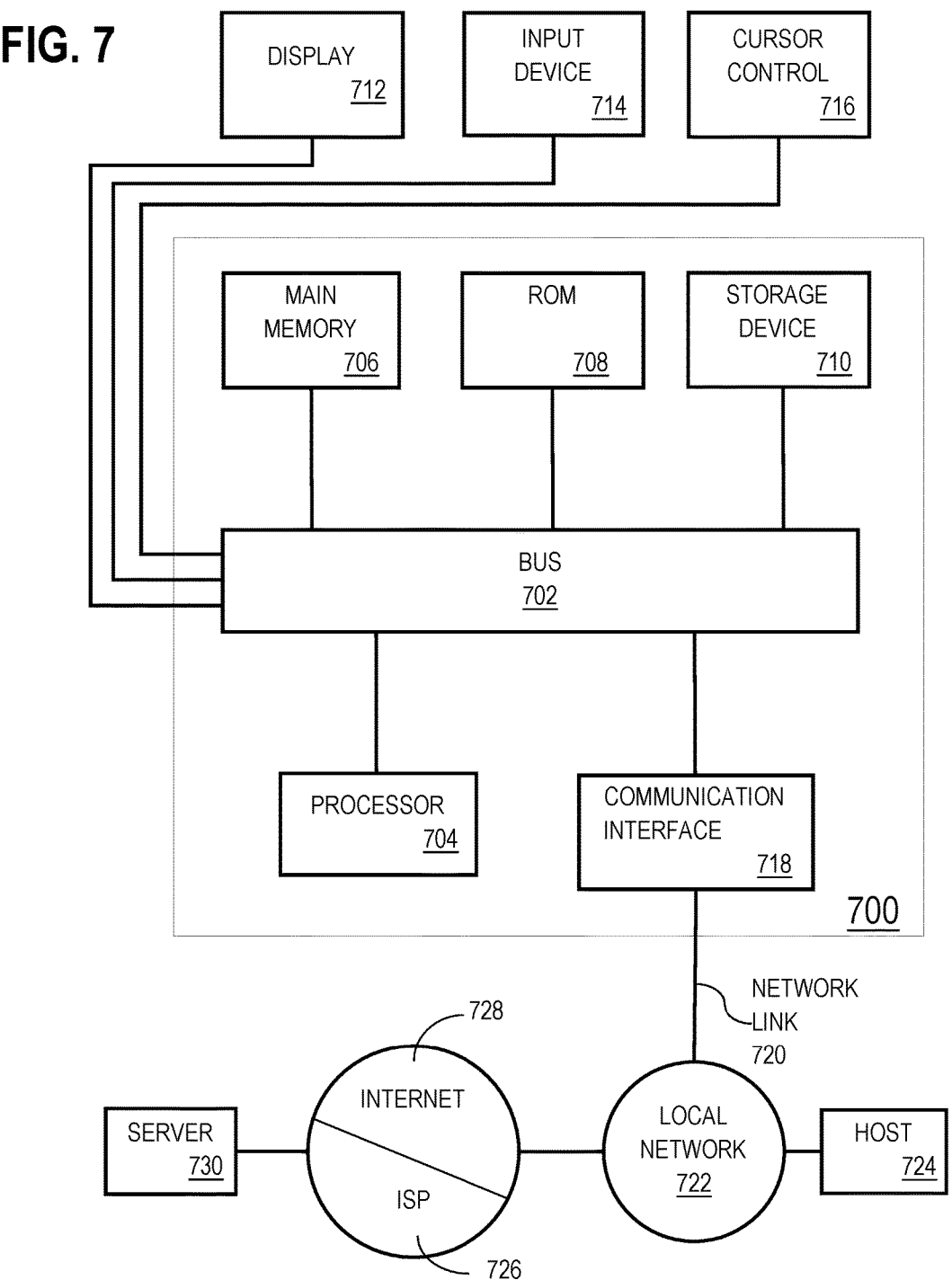
FIG. 7 illustrates a system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of steps comprising:

determining that an annotation is associated with a particular module element defined by a first set of module code;

identifying a second set of module code that defines an annotation type of the annotation;

determining that the annotation type requires that the annotation only be applied to the particular module element if a module descriptor, of the first set of module code defining the particular module element, declares a particular kind of dependency on the second set of module code defining the annotation type of the annotation associated with the particular module element;

determining whether the module descriptor declares a dependency, of the particular kind, on the second set of module code;

based on whether the module descriptor declares the dependency, of the particular kind, on the second set of module code, performing one of:

presenting, by a compiler or a runtime environment, an error or warning corresponding to an applicability of the particular annotation to the particular module element at least in response to determining that the module descriptor does not declare any dependency, of the particular kind, on the second set of module code; or refraining, by the compiler or the runtime environment, from presenting the error or the warning corresponding to the applicability of the particular annotation to the particular module element at least in response to determining that the module descriptor declares the dependency, of the particular kind, on the second set of module code.

2. The medium of claim 1, wherein the particular kind of dependency comprises a static dependency.

3. The medium of claim 1, wherein the particular kind of dependency comprises a transitive dependency.

4. The medium of claim 1, wherein the particular kind of dependency comprises any dependency that matches a retention policy defined for the annotation type.

5. The medium of claim 1, wherein the particular kind of dependency is defined in a meta-annotation that annotates the annotation type's declaration.

6. The medium of claim 1, wherein the steps further comprise:

identifying a plurality of module elements that are (a) defined by the first set of module code and (b) annotated by a respective plurality of annotations, wherein the plurality of annotations are of a respective plurality of annotation types with different requirements;

determining that the plurality of annotation types require conflicting kinds of dependencies by the module descriptor, of the first set of module code, on the second set of module code;

responsive to determining that the plurality of annotation types require conflicting kinds of dependencies by the module descriptor, of the first set of module code, on the second set of module code:

splitting the first set of module code into a third set of module code and a fourth set of module code such that:

(a) annotation types, defined in the second set of module code, of annotations in the third set of module code do not require conflicting kinds of dependencies by a respective module descriptor, of the third set of module code, on the second set of module code; and (a) annotation types, defined in the second set of module code, of annotations in the fourth set of module code do not require conflicting kinds of dependencies by a respective module descriptor, of the fourth set of module code, on the second set of module code.

7. The medium of claim 1, wherein the annotation type defines a set of one or more elements of the annotation.

8. A system comprising:

at least one device including a hardware processor;

the system being configured to perform operations comprising:

determining that an annotation is associated with a particular module element defined by a first set of module code;

identifying a second set of module code that defines an annotation type of the annotation;

determining that the annotation type requires that the annotation only be applied to the particular module element if a module descriptor, of the first set of module code defining the particular module element, declares a particular kind of dependency on the second set of module code defining the annotation type of the annotation associated with the particular module element;

determining whether the module descriptor declares a dependency, of the particular kind, on the second set of module code;

based on whether the module descriptor declares the dependency, of the particular kind, on the second set of module code, performing one of:

presenting, by a compiler or a runtime environment, an error or warning corresponding to an applicability of the particular annotation to the particular module element at least in response to determining that the module descriptor does not declare any dependency, of the particular kind, on the second set of module code; or refraining, by the compiler or the runtime environment, from presenting the error or the warning corresponding to the applicability of the particular annotation to the particular module element at least in response to determining that the module descriptor declares the dependency, of the particular kind, on the second set of module code.

9. The system of claim 8, wherein the particular kind of dependency comprises a static dependency.

10. The system of claim 8, wherein the particular kind of dependency comprises a transitive dependency.

11. The system of claim 8, wherein the particular kind of dependency comprises any dependency that matches a retention policy defined for the annotation type.

12. The system of claim 8, wherein the particular kind of dependency is defined in a meta-annotation that annotates the annotation type's declaration.

13. The system of claim 8, wherein the operations further comprise:

identifying a plurality of module elements that are (a) defined by the first set of module code and (b) annotated by a respective plurality of annotations, wherein the plurality of annotations are of a respective plurality of annotation types with different requirements;

determining that the plurality of annotation types require conflicting kinds of dependencies by the module descriptor, of the first set of module code, on the second set of module code;

responsive to determining that the plurality of annotation types require conflicting kinds of dependencies by the module descriptor, of the first set of module code, on the second set of module code:

splitting the first set of module code into a third set of module code and a fourth set of module code such that:

(a) annotation types, defined in the second set of module code, of annotations in the third set of module code do not require conflicting kinds of dependencies by a respective module descriptor, of the third set of module code, on the second set of module code; and (a) annotation types, defined in the second set of module code, of annotations in the fourth set of module code do not require conflicting kinds of dependencies by a respective module descriptor, of the fourth set of module code, on the second set of module code.

14. A method comprising:

determining that an annotation is associated with a particular module element defined by a first set of module code;

identifying a second set of module code that defines an annotation type of the annotation;

determining that the annotation type requires that the annotation only be applied to the particular module element if a module descriptor, of the first set of module code defining the particular module element, declares a particular kind of dependency on the second set of module code defining the annotation type of the annotation associated with the particular module element;

determining whether the module descriptor declares a dependency, of the particular kind, on the second set of module code;

based on whether the module descriptor declares the dependency, of the particular kind, on the second set of module code, performing one of:

presenting, by a compiler or a runtime environment, an error or warning corresponding to an applicability of the particular annotation to the particular module element at least in response to determining that the module descriptor does not declare any dependency, of the particular kind, on the second set of module code; or refraining, by the compiler or the runtime environment, from presenting the error or the warning corresponding to the applicability of the particular annotation to the particular module element at least in response to determining that the module descriptor declares the dependency, of the particular kind, on the second set of module code;

wherein the method is executed by at least one device including a hardware processor.

15. The method of claim 14, wherein the particular kind of dependency comprises a static dependency.

16. The method of claim 14, wherein the particular kind of dependency comprises a transitive dependency.

17. The method of claim 14, wherein the particular kind of dependency comprises any dependency that matches a retention policy defined for the annotation type.

18. The method of claim 14, wherein the particular kind of dependency is defined in a meta-annotation that annotates the annotation type's declaration.

19. The method of claim 14, further comprising:

identifying a plurality of module elements that are (a) defined by the first set of module code and (b) annotated by a respective plurality of annotations, wherein the plurality of annotations are of a respective plurality of annotation types with different requirements;

determining that the plurality of annotation types require conflicting kinds of dependencies by the module descriptor, of the first set of module code, on the second set of module code;

responsive to determining that the plurality of annotation types require conflicting kinds of dependencies by the module descriptor, of the first set of module code, on the second set of module code:

splitting the first set of module code into a third set of module code and a fourth set of module code such that:

(a) annotation types, defined in the second set of module code, of annotations in the third set of module code do not require conflicting kinds of dependencies by a respective module descriptor, of the third set of module code, on the second set of module code; and (a) annotation types, defined in the second set of module code, of annotations in the fourth set of module code do not require conflicting kinds of dependencies by a respective module descriptor, of the fourth set of module code, on the second set of module code.

* * * * *

UNITED STATES PATENT AND TRADEMARK OFFICE
CERTIFICATE OF CORRECTION

PATENT NO. : 10,282,184 B2
APPLICATION NO. : 15/638112
DATED : May 7, 2019
INVENTOR(S) : Buckley Page 1 of 1

It is certified that error appears in the above-identified patent and that said Letters Patent is hereby corrected as shown below:

In Column 25, Line 60, in Claim 6, delete "(a)" and insert -- (b) --, therefor.

In Column 27, Line 4, in Claim 13, delete "(a)" and insert -- (b) --, therefor.

In Column 28, Line 35, in Claim 19, delete "(a)" and insert -- (b) --, therefor.

Signed and Sealed this
Twenty-first Day of July, 2020

Andrei Iancu
*Director of the United States Patent and Trademark Office*